M. A. Hamilton.
Churn Dasher.
N°. 96,693. Patented Nov. 9, 1869.

WITNESSES.
H. C. Burtman.
Palmer Hamilton.

INVENTOR.
Milton A. Hamilton

United States Patent Office.

MILTON A. HAMILTON, OF DETROIT, MICHIGAN.

Letters Patent No. 96,693, dated November 9, 1869.

IMPROVEMENT IN CHURN-DASHERS.

The Schedule referred to in these Letters Patent and making part of the same

*To all whom it may concern:*

Be it known that I, MILTON A. HAMILTON, of Detroit, in the county of Wayne, and State of Michigan, have invented a new and improved Dasher for Churns; and I do hereby declare that the following is a full and exact description thereof, reference being had to the accompanying drawings, and to the letters of reference marked thereon, making a part of this specification.

Figure 1:
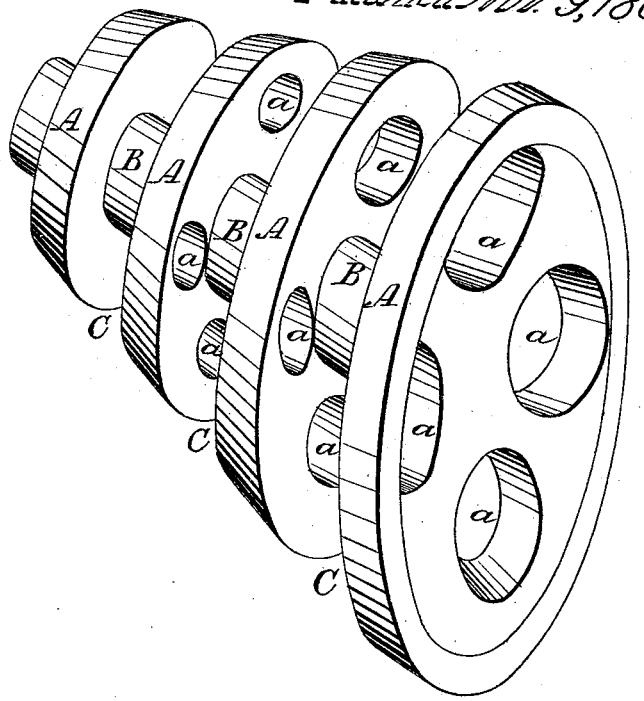

Figure 1 is a perspective view of the dasher, in which the disks A are concave on the under side, and convex on the upper side, the lower three of which are perforated with holes $a$.

The disks A are all air-chambers, connected together at their centre B, the upper one being the smallest in area, and having no perforations, the area of each disk being greater than the one next above it, the holes $a$ corresponding in size. Between the disks A is the annular space C.

Figure 2:
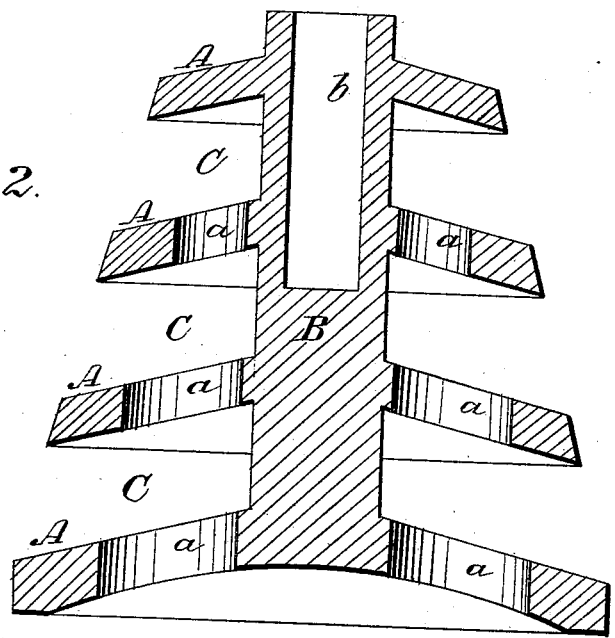

Figure 2 is a vertical section of the dasher, showing the hole in the top, at the centre $b$, for the attachment of a handle.

The nature of my invention consists in so constructing a dasher, for use in any churn adapted to the use of the common dasher, that sufficient agitation may be secured, together with the introduction of air in the cream, and forcing the air through the cream to be churned, as the dasher is moved up and down, in and out of the cream, in order to produce the most in quantity of butter in the shortest possible time, and in the easiest manner.

To enable others skilled in the art to make and use my invention, I will proceed to describe its construction and operation.

I take a piece of wood and turn it to the shape of a cone, of the required size, and turn out a concavity, at the larger end, which forms the bottom of the lower disk A of the dasher. I then turn out the annular space C, nearly to the centre, leaving sufficient wood at the centre B for strength of attachment of the lower disk to the upper parts of the dasher, turning so as form the top of the lower disk convex or parallel with its under side, and the under side of the next disk concave, and so on, until as many disks are formed as are required.

The holes $a$ in the disks A, and the hole $b$ at the top of the dasher for the handle, are made in the ordinary manner.

This dasher may be made in one or several pieces, and connected, of wood or metal, or of both, and the relative size and shape of the disks A and of the annular space C varied as may be required.

To operate this dasher successfully, it should be raised partially out of the cream at each stroke, and carried to the bottom of the churn in rapid succession. The under side of each disk A, or section of the dasher being concave, a quantity of air is carried down with each stroke of the dasher, and forced through the cream, a part of which is forced through the lower disks A or sections, at the holes $a$, against the under surface of the disk A next above the lower disk, and projected out of the annular space C, thus producing the agitation and contact of air in and with the cream, which have been proved, by practical experience, most effectual in breaking the sacs or globules in the cream, which contain the butter, and gathering the same.

This dasher, properly operated, will produce butter from cream of about the temperature of 65° Fahrenheit, in from three to ten minutes.

Having thus described my invention, I do not claim the conical or pyramidal form of the dasher, but

I claim the series of disks A A A A, made concave on their lower side, and convex on their upper side, when two or more are connected at their centres to the stem B, placed a short distance apart, and perforated by the holes $a\ a$, substantially as shown and for the purpose specified.

MILTON A. HAMILTON.

Witnesses:
   H. C. BRUTMAN,
   PALMER HAMILTON.